United States Patent [19]

Trytko

[11] Patent Number: 5,010,407
[45] Date of Patent: Apr. 23, 1991

[54] VIDEO EFFECTS SYSTEM WITH RECIRCULATION VIDEO COMBINE AND OUTPUT COMBINE

[75] Inventor: David E. Trytko, Foster City, Calif.

[73] Assignee: Ampex Corporation, Redwood City, Calif.

[21] Appl. No.: 333,201

[22] PCT Filed: Mar. 25, 1988

[86] PCT No.: PCT/US88/01031

§ 371 Date: Nov. 11, 1988

§ 102(e) Date: Nov. 11, 1988

[87] PCT Pub. No.: WO88/07801

PCT Pub. Date: Oct. 6, 1988

Related U.S. Application Data

[63] Continuation of Ser. No. 32,155, Mar. 27, 1987, abandoned.

[51] Int. Cl.⁵ .................. H04N 5/262; H04N 9/74; H04N 5/14; H04N 5/53
[52] U.S. Cl. ...................... 358/183; 358/22; 358/160; 358/178
[58] Field of Search .............. 358/22, 182, 183, 160, 358/178, 174

[56] References Cited

U.S. PATENT DOCUMENTS

| | | | |
|---|---|---|---|
| 3,499,982 | 3/1970 | O'Neal | 358/242 |
| 3,673,324 | 6/1972 | Ito et al. | 358/22 |
| 3,728,479 | 4/1973 | Srinivasan | 358/183 |
| 4,001,498 | 1/1977 | Morishita et al. | 358/160 |
| 4,090,218 | 5/1978 | Von Buul et al. | 358/37 |
| 4,163,249 | 7/1979 | Michael | 358/21 R |
| 4,168,510 | 9/1979 | Kaiser | 358/183 |
| 4,207,596 | 6/1980 | Pires | 358/182 |
| 4,233,631 | 11/1980 | Mahler | 358/182 |
| 4,249,212 | 2/1981 | Ito et al. | 358/183 |
| 4,266,242 | 5/1981 | McCoy | 358/22 |
| 4,322,750 | 3/1982 | Lord et al. | 358/140 |
| 4,334,245 | 6/1982 | Michael | 358/183 |
| 4,360,831 | 11/1982 | Kellar | 358/182 |
| 4,400,719 | 8/1983 | Powers | 358/21 R |
| 4,420,770 | 12/1983 | Rahman | 358/183 |
| 4,488,169 | 12/1984 | Yamamoto | 358/22 |
| 4,554,580 | 11/1985 | Hayashi | 358/107 |
| 4,593,316 | 6/1986 | Kellar et al. | 358/140 |
| 4,602,286 | 7/1986 | Kellar et al. | 358/183 |
| 4,621,280 | 11/1986 | Shinohara et al. | 358/22 |
| 4,623,915 | 11/1986 | Bolger | 358/22 |
| 4,684,990 | 8/1987 | Oxley | 358/183 |
| 4,700,232 | 10/1987 | Abt et al. | 358/183 |
| 4,758,892 | 7/1988 | Bloomfield | 358/183 |

FOREIGN PATENT DOCUMENTS 0160549 11/1985 European Pat. Off. .
2000413 1/1979 United Kingdom .

OTHER PUBLICATIONS

Storey, "Teletrack"-A Special Effect, SMPTE Journal, A Recent Innovation in Digital Special Effects, Oct. 1978, vol. 87, No. 10, pp. 673-676.
PCT Intnl Pub WO 86/06233.
PCT Intnl Pub WO 86/06234.

Primary Examiner—John K. Peng
Attorney, Agent, or Firm—John S. Bell; Richard J. Roddy

[57] ABSTRACT

A video effects system having a video channel with a recirculating loop for incoming video including means for processing or cutting the video signal during each recirculation, and separately processing video information from the recirculation loop to a combiner at the data output, so that the data output video may be different from the recirculated video.

26 Claims, 4 Drawing Sheets

VIDEO EFFECTS SYSTEM WITH RECIRCULATION VIDEO COMBINE AND OUTPUT COMBINE

CROSS REFERENCE TO RELATED APPLICATIONS

This application is a continuation application and claims the benefit of earlier filing dates from International Application No. PCT/US88/01031 having an International Filing Date of Mar. 25, 1988 and U.S. application Ser. No. 07/032,155 filed Mar. 27, 1987, now abandoned.

This invention relates generally to video systems for the creation of a variety of special effects and, more particularly, to a video system in which separately calculated key signals are employed to adjust the gain of input video signals, recirculating video signals and output video signals presented to an output combiner so that a composite video signal can be formed therefrom.

BACKGROUND OF THE INVENTION

In the television industry there is an ongoing desire to combine video signals in a variety of ways to create various special effects For example, a common function of a digital video effects system is to compress a full field of video to a size smaller than the raster area occupied by a full size field of television signal. The smaller raster is then displayed at a predetermined location within the larger raster of video Framestores recently have been developed for use in the video industry to store video information for the creation of special effects Such devices typically include a memory device capable of holding at least one complete raster of video information, i.e., either a field or a complete frame of video information. One such framestore system is described in U.S. Patent Application entitled "A Recirculating Special Effects Video Framestore" by David E. Trytko, filed Sept. 13, 1989 as U.S. patent application Ser. No. 07/407,722, which was a continuation of copending application Ser. No. 07/195,370 filed May 11, 1988, now abandoned, which was a continuation of copending application Ser. No. 06/943,282 filed Dec. 8, 1986, now abandoned, which was a continuation-in-part of copending application International Application No. PCT/US86/00733 filed Apr. 11, 1986, which was a continuation-in-part of copending application Ser. No. 06/722,532 filed Apr. 12, 1985, now abandoned and assigned to the same assignee as the present patent application the details of which are hereby incorporated by reference.

In creating special effects, digital video signals are typically combined through the use of key signals. Two unprocessed video signals cannot be directly combined because the combined signal gain would be the sum of the initial gains of each unprocessed video signal and could exceed the maximum gain resource of the system, i.e., the combined video signal can have a maximum gain no larger than the maximum gain of any of the component video signals. Thus, if all component video signals in the system are allowed to vary in gain anywhere from 0 to 1 volt, the maximum gain excursion of a composite video signal consisting of a combination of two or more component video signals can be no more than from 0 to 1 volt The key signals are used according to the teachings of the invention to cut the gain of component video signals according to calculations relating to the transparency factor of each signal, the maximum available gain for the composite signal and the priority of the various signals. By using separate key signals for each video signal, the key signals can be independently processed to control the gains of the component video signals in such a manner that the final composite video signal uses all the available gain resource without the injection of spurious noise. That is, prior to combining video signals, each individual video signal is gain adjusted by its respective key signal in such a manner that the composite video signal does not exceed an overall reference gain which is the maximum allowable gain resource available to any video signal in the system. A more complete understanding of key signals in video signal processing can be obtained from U.S Patent Application entitled "Apparatus and Method for Processing Video Signals With Key Signals in Accordance With Previous Processing of the Video Signals " by John F. Bloomfield, filed Sept. 1, 1989 as U.S. patent application Ser. No. 07/403,898, which was a continuation of copending application Ser. No. 07/191,778 filed May 2, 1988, now abandoned, which was a continuation of copending application Ser. No. 07/119,223 filed Nov. 3, 1987, now abandoned, which was a continuation-in-part of copending application Ser. No. 06/851,195 filed Apr. 14, 1986, now abandoned, which was a continuation-in-part of copending application International Application No. PCT/US86/00734 filed Apr. 11, 1986, which was a continuation-in-part of copending application U.S. Ser. No. 06/722,532 filed Apr. 12, 1985, now abandoned, and also assigned to the same assignee as the present patent application the details of which are hereby incorporated by reference.

Another well known device used in video effects systems is a combiner which is a device to do a "combine" of two or more video signals. A "combine" is effected by combining two or more channels of video information in such a way as to make the scenes or images appear in a desired relationship with each other, e.g., one in front of the other, a transparent image, one image flying over another, one image moving and leaving a trail, etc. One such combiner is illustrated, by way of example in U.S. Pat. No. 4,758,892 entitled "Circuit for Producing a Video Combine from Multiple Video Images" filed on Apr. 27, 1984 by John F. Bloomfield, assigned to the same assignee as the present patent application the details of which are hereby incorporated by reference.

In the video effect system described in the above identified U.S. patent application Ser. No. 407,722, video information is held in a memory sometimes hereafter referred to as a framestore or store and is recirculated. This recirculated video is combined with new or input video information in a combiner during recirculation. The recirculated video is processed or "cut" by a key signal in a controllable manner during each recirculation to reduce the gain of the signal. This cut allows combining the recirculated video signal with other video having a known gain to produce desired video effects in the form of an output video signal having a gain which does not exceed the system's maximum allowable gain. It is a limitation of such systems that once video information in the store has been processed or cut by the key signal during recirculation, the lost gain cannot be restored since to increase the gain of a video signal by multiplying it by a value greater than 1 only adds noise since there is no new video information in the multiplication operation. Thus, the cut video information is recirculated back into the frame store and overwrites the video information stored therein. The video information that existed before the cut is therefore forever lost. This is disadvantageous since it is desirable for certain special video effects to be able to make the recirculated video information from the framestore appear at various gain levels, disappear and then reappear at any gain level compatible with the maximum allowable system gain.

SUMMARY OF THE INVENTION

The video effects system according to the present invention provides a video system with enhanced special effect capabilities through the use of two combiners, one at the input of the recirculation loop and one at the output of the recirculation loop. The strategic placement of five different "cutters" throughout the system including one between the output of the recirculation loop and the output combine and the use of separate key signals calculated for each combine function allow great flexibility in the types of special effects that may be achieved A "cutter" is a gain modifying device such as a multiplier which can reduce the gain of a digital pixel of video information by multiplying the digital value representing the gain by a digital number multiplier representing a key signal corresponding to that pixel.

Some of the special effects which may be achieved according to the teachings of the invention cannot be performed by prior art systems. Two key processors in the preferred embodiment provide independent control of certain key signals as a function of certain other key signals to prevent the maximum gain resource of the system from being exceeded and to provide optical correctness. The key processors calculate the keys so that the composite video signals have a maximum gain which is not more than the maximum allowable gain of any component video signal. This maximum gain is equal to the maximum allowable gain of the system. The calculation of the key signals is done in accordance with certain rules of priority and in accordance with the desired gain or transparency value desired for each signal component of the composite video.

In accordance with this invention, a recirculation loop is provided to store and recirculate video. This recirculated video information is processed by a memory key signal during each recirculation prior to being combined in a video combiner coupled to the input of the recirculation loop. The recirculation video so processed is then combined with new input video information to be written into the framestore which itself may be cut by a key signal. In addition, the video information output by the framestore is processed by an output key signal and is combined with input video in an output video combiner. The use of a separate output key signal and memory key signal allows the recirculation video to disappear and reappear in the output video from the output combiner. The two key signals, i.e., the memory key signal and the output key signal are separately processed so that the output video may be different from the recirculated video held in the framestore. Accordingly, it is possible to process or cut the output video from the framestore to fade the video image from the recirculation video and then make it reappear. Further, it possible to cause the recirculation video to have a variable amount of apparent transparency by controlling the output key signal while maintaining the video in the framestore uncut.

In one embodiment, the output key and the memory key are processed by separate key processors which are coupled to the appropriate cutters through a multiplexer. Each key processor generates the appropriate key signal as a function of another key signal indicating the key space available. Key space available is the amount $1-K$ where K is the key taken previously on the signal with which the signal being processed is to be combined and 1 is the reference gain representing the maximum gain permissible in the system. This enables each key processor to adjust the key being generated by the key processor to compensate for processing already performed by the controlling key signal. For example, the memory key is processed as a function of the key taken on the new input video being supplied to the memory combine at the input of the recirculation loop so that the output video from this combine does not exceed the reference gain. Also, the output key is generated as a function of the key taken on the main video input to the output combine so that the recirculation video being output from the recirculation loop to the output combine has its gain cut to an appropriate value to prevent the output video from the output combine from exceeding the maximum system gain.

In addition, in an external key mode, it is possible to present a video signal at the output of the output combiner which, at all times, utilizes the maximum available resource in conjunction with an output key signal representing the amount by which the video signal is to be cut by subsequent circuits. The video signal and key signal can then be transmitted to an external processing device, such as a video production switcher, to process the video information in accordance with the key signal.

Various of the above-mentioned further features and advantages of the video effects system according to the present invention will be apparent from the detailed description appearing hereinafter.

DETAILED DESCRIPTION OF THE PREFERRED EMBODIMENT

Figure 1:
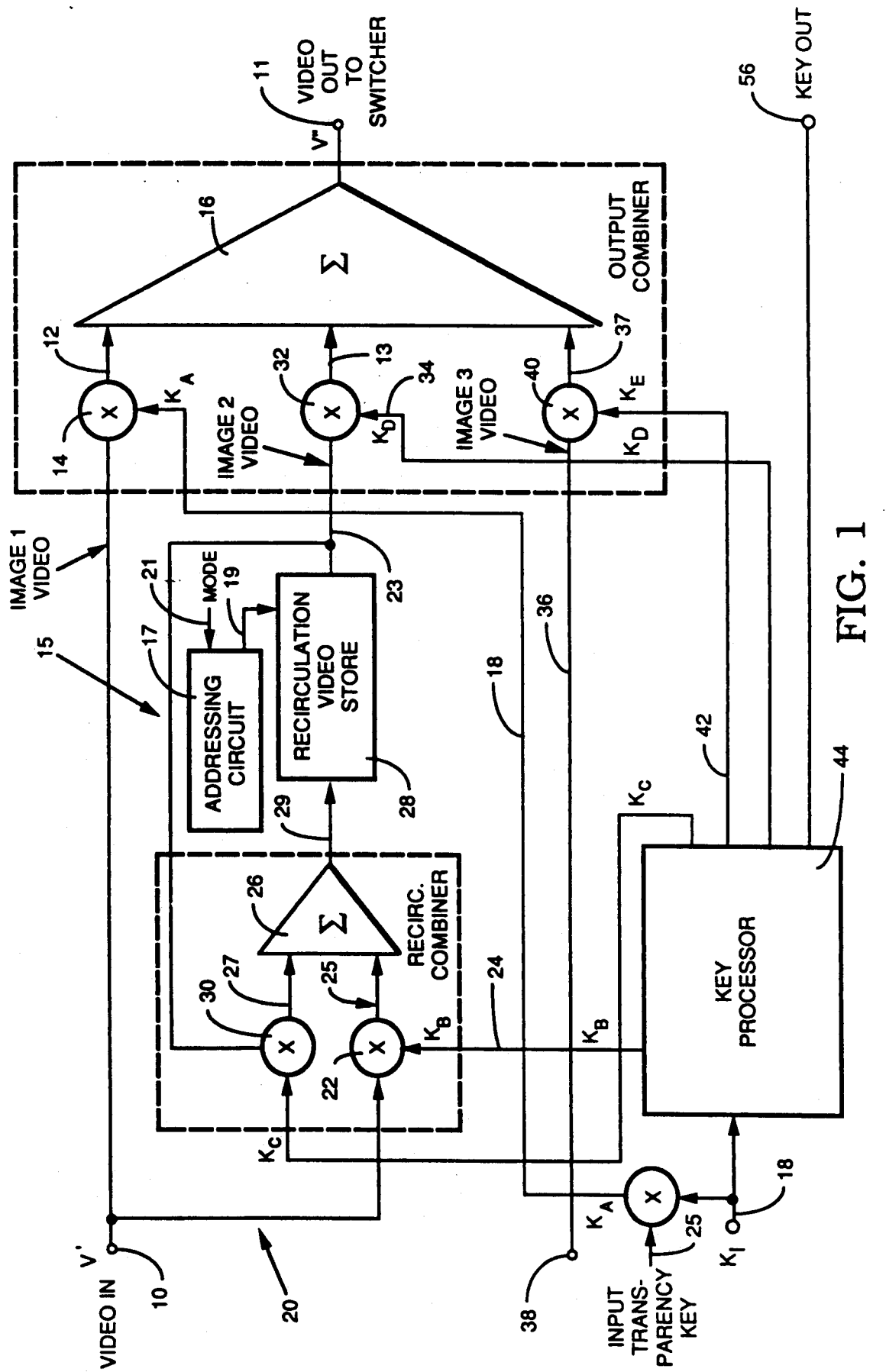
FIG. 1 is a representation in block diagram form of one embodiment of a video effects system according to the present invention.

Referring initially to FIG. 1, there is seen one embodiment of a video effects system according to the present invention. An input video signal V' is received at an input 10 and is coupled through a video channel 12 which includes a gain adjusting device, such as multiplier 14, to a first summer 16 sometimes also referred to herein as the output combiner. Actually, the output combiner is the combination of the gain adjusting devices 14, 32 and 40 (sometimes hereafter referred to as cutters) and the summer 16. A composite video signal V" is coupled out of the video system via an output 11. The multiplier 14 adjusts the gain of the video signal V' according to the value of an input key signal $K_A$ presented on line 18 to the control terminal of the multiplier 14. The video data on bus 12 comprises, in the preferred embodiment, a stream of digital data that defines the pixel color and intensity of all the pixels on each raster line of each field and frame of picture information. Each frame of picture information is comprised of two fields of raster lines one of which has 262 lines and the other of which has 263 lines (NTSC only; PAL format video is different). The multiplier 14 receives a key signal $K_A$ for each pixel, i.e., the value of $K_A$ is updated for each pixel. The value of $K_A$ is multiplied in multiplier 14 by the pixel data to which it applies arriving from terminal 10 and the resulting data is output on bus 12. In analog embodiments, the gain adjusting device 14 would be some analog circuit which could perform the analog version of a multiply operation in digital processing.

The system of FIG. 1 basically provides three video sources to the output summer 16 where the three streams of video data are combined in various proportions established by the various key signals to form the output video signal V" on bus 11. Besides the main video which may sometimes hereafter be referred to as image 1 data, there is also a source of recirculation video data on bus 13 from the output of a gain modifying device 32 which may sometimes hereafter be referred to as image 2 data. The third source of video data is background video which may sometimes hereafter be referred to as image 3 data.

In digital embodiments, the gain modifying device 32 may be a multiplier. The recirculation video data is generated in a recirculation loop 15 which has the capability of receiving video data, storing it in a framestore 28 for a one field or one frame interval and then recirculating it for reinput to the framestore either alone or combined with new video data.

The recirculation loop 15 is structured as follows. The input video signal V' is coupled through a second video channel 20 to another control device, such as multiplier 22, which adjusts the level of the video signal V' in accordance with a key signal $K_B$ presented on a line 24 to the control terminal of a gain modifying device 22. As is the case for all the gain modifying devices, in digital embodiments, the device 22 may be a multiplier. This gain adjusted video information is then presented to the recirculation loop 15 consisting of a second combiner, sometimes hereafter referred to as a recirculation combiner and consisting of the cutters 22 and 30 and the summer 26, and a storage device 28, sometimes hereafter referred to as a framestore. Preferably, the framestore 28 is of sufficient size to retain a full frame of video information including both fields.

The recirculation loop includes a gain modifying device 30. The latter is connected between the output of the framestore 28 and one input of the summer 26. The other input of the summer 26 is coupled to the output of the gain modifying device 22. The video data on line 29 can have a gain anywhere from 0 to the maximum available resource. The multiplier 30 adjusts the gain of the recirculating video information presented to the second summer 26 in accordance with a key signal $K_C$ presented via the line 31 to its control terminal. Video information is coupled out of the recirculation loop via a control device, such as multiplier 32. This device adjusts the gain of the recirculation video information presented to the output summer 16 in accordance with a key signal $K_D$ presented via the line 34 to its control terminal.

One or more additional video channels, such as represented by a video channel 36 may be provided and will include an input 38 for such additional video information. Typically, this video information will be background video. This video information is then coupled via a control device such as a multiplier 40 to an input of the output summer 16. The level of the video information coupled therethrough is adjusted in accordance with a key signal $K_E$ presented to the control terminal of the multiplier 40 on the line 42.

The multiplier 14, the multiplier 22, the multiplier 30, the multiplier 32, and the multiplier 40 adjust the gain of the video signals passing therethrough in response to respective key signals. A video signal is preferably composed of discrete digitally encoded video samples related to separate pixels that collectively define the video image. In turn, each pixel may be comprised of a plurality of different components, such as a single luminance and a pair of chrominance components, each having an independent level but each having the same gain. In such systems, each video pixel will have a corresponding key signal, and each key signal may have a value of between zero and one. Any pixel's signal is applicable to all signal components corresponding to that pixel. As in the present embodiment where the control devices are multipliers, a video signal is processed by multiplying its input value with that of the corresponding key signals for each pixel to produce a resultant output video signal instantaneous value at the output summer 16.

A key processor 44 calculates a key signal for each multiplier in the video channels. For example, one set of conditions for a key signal is a value of either zero or one. If a video signal is multiplied with a key signal having a value of zero, the resulting video signal would have a gain of zero, which is the absence of a video image. If a video signal is multiplied by a key signal that has a value of one, the value of the resultant video signal is unchanged and would be viewed on a monitor as unchanged.

Of course, the video signal can be multiplied by a key signal having a value of between zero and one. The effect of multiplying the video information with a key reducing from one to zero is to give the resulting raster of video an increasingly transparent appearance, because video from another source can then be added to the raster such that the other video appears to be increasingly visible through the video which has been so processed. Thus when the key signal value is reduced to zero, the processed video will no longer be visible. Additionally, because video information from more than one source is being combined in the first summer 16, it is necessary for the key processor 44 to adjust the value of the key signals in the system to assure that the sum of the key signals is not greater than one.

The system of FIG. 1 is capable of operation in either a field mode where both fields of data are updated during every field or a frame mode where each field is updated as it arrives where each field arrives separately and sequentially. In the field mode, the assumption is that the pixels of field B will be set equal to the corresponding pixels in field A as the field A pixels arrive. Further, the field A pixels will be set equal to the corresponding field B pixels as the field B pixels arrive In field mode, the addressing circuitry 17 and the store 28 combine to provide a one field delay. This delay is between the arrival of pixel data from one field and output of the same pixel data as the recirculation video pixel data for the next field which is simultaneously arriving at input 10. That is, the recirculation video data that is combined with the field A video data as it arrives is the data stored in the store 28 during the preceding field B interval and vice versa. In the frame mode, the addressing circuitry 17 and the store 28 combine to provide a one frame delay. That is, the video pixel data for both fields A and B arriving at input 10 is stored in store 28 as it arrives. The video pixel data from the previous frame (e.g., frame 1) stored in the store 28 is output on bus 23 as the recirculation video pixel data for the current frame (e g., frame 2). That is, for example, as pixel 1 of line 1 of frame 2 arrives at input 10, store 28 and addressing circuitry 17 combine to output pixel 1 from line 1 of the previous frame, frame 1, on bus 23.

Addressing circuitry 17 provides the necessary address signals on the bus 19 to implement either mode in accordance with a mode control signal on a line 21. The basic purpose of the recirculation video store 28 is to provide a delay of either one field or one frame between the storage of video information from bus 29 and outputting of the same video on bus 23 either one field or one frame later. The addressing circuitry makes this possible by generating the proper address signals and control signals on the bus 19 to make the proper delay happen in accordance with a mode control signal on the line 21. Basically, the addressing circuit 17 generates addresses continuously and sequentially by counting in synchronization with the pixel data as it arrives. The addressing circuitry presents the address where the data defining each pixel is to be stored in the framestore 28 as that pixel data arrives If the system is operating in the field mode, the addressing circuitry counts up to the end pixel address on raster line 262 for field 1, and then resets to 0 (NTSC only). For the next field, the counter counts up to the last pixel address on line 263 and resets to 0 (NTSC only). In the frame mode, the counters in the addressing circuitry count up to the last pixel in line 525 (NTSC only) before resetting to 0 and starting to count up again. Essentially, the addressing and storage of-data in the framestore results in a delay between the input of the video data and the readdressing of that data and presentation of that data at the output 23 of the framestore. It is this delay which allows certain special effects such as trails to be performed. The delay can be altered by changing the mode signal.

In the prior art, specifically U.S. patent application Ser. No. 943,282, filed Dec. 8, 1986 cited above, two separate recirculation loops and a field interpolation circuit were used. One recirculation loop was used to store video data from the first field of a frame and the other recirculation loop was used to store interpolated video data for the other field of the frame. The field interpolation circuit interpolated the pixels of the other field as the actual pixel data for the current field was arriving. In other words, as the actual pixel data for field 1 arrived, the pixel data for field 2 of the same frame was simultaneously derived by the field interpolation circuit when operating in the field mode. The reverse happened as the actual pixel data for field 2 arrived. The field interpolation circuit was used in that system to prevent annoying flicker which would otherwise result without the interpolation. The field interpolation algorithm used in the system just described worked as follows. Assume the first-field in a frame is called A and is comprised of raster lines $A_1$ and $A_{262}$ and the second field in the frame is comprised of raster lines $B_1$ through $B_{263}$. The field interpolation circuit interpolates the first pixel in line $B_1$ by adding ½ of the value of the first pixel in line $A_1$ to ½ of the value of the first pixel in line $A_2$. This process is repeated for each pixel using the values of the pixels directly adjacent to it in the opposite interlaced field.

It was realized that if the interpolation algorithm was changed such that the pixels in the interpolated field were made equal to the pixels in the current field, i.e., pixel 1 of line $B_1$ was made equal to pixel 1 of line $A_1$, that a savings in circuitry could be made with only a slight loss in vertical resolution. Accordingly, only one recirculation loop is shown in the embodiments disclosed herein. However, those skilled in the art will appreciate that either the field mode or the frame mode of operation can be achieved with the embodiments shown. That is, if field A is stored in the framestore 28, by the time the addressing circuitry 17 readdresses line 1 of field A, field B will be arriving at terminal 10. Since field B is equal to field A, the output of the framestore 28 will be the pixel data of field A of the previous frame as the pixel data of the current field B is arriving. As the addressing circuitry progresses through the pixel locations of the framestore, the old data is output on the bus 23 and the new data of the current field B is written into the framestore. This provides continuous updating of the video data in the frame store. Since the video data coming out of the store 28 has been delayed by either one frame or one field depending upon the operation mode, special effects such as trails may be performed by mixing the framestore output on bus 23 with the current video on bus 12.

A trail is a series of images shown simultaneously with the image showing a moving object's current position. The series of images shown the previous positions of the object. As an example of how to use the embodiment of FIG. 1 to do a trail effect, imagine the video data defining the current position of a moving baseball as currently arriving at terminal 10. Cutter 14 has its key signal $K_A$ manipulated on a pixel by pixel basis to be 1 at every pixel defining the baseball's current position and 0 at every other pixel. The key signal $K_I$ arrives on line 18 from some external circuitry which is not part of the invention. If the image of the baseball's position was to be made "transparent" such that other images behind it may be seen through the baseball, the key $K_A$ may itself be cut by an input transparency key supplied on line 25 by circuitry which is not part of the invention. The trail images are supplied by continuously updating the contents of the framestore 28 with new video via the bus 20 and the cutter 22. As each new field of video data arrives at terminal 10, it is written into the framestore 28 by the action of summer 26. The kay signal $K_B$ is manipulated on a pixel by pixel basis to allow the video data defining the current position of the baseball to be supplied at the input 25 of the summer 28. This video data is combined with the recirculated video on bus 27 which defines the former positions of the baseball by virtue of the delay imposed by the framestore. Each new update of the framestore 28 adds a new image to it. The images in the framestore of the baseball's former positions may be made to decay at any desired rate by manipulating the key $K_C$ such that the recirculation video pixel data is multiplied by a factor between 0 and 1 on each recirculation. A key processor 44 generates the key $K_C$ as a function of the key $K_B$ so that the combination of the recirculation video on bus 27 and the update video on bus 25 does not result in a combined video signal on bus 29 which has a gain greater than 1 or the maximum allowable system gain. How the key processor does this will be described in more detail below. The output of the framestore 28 on line 23 is video data which describes the former positions of the baseball. This video data is applied to the output summer 16 via the cutter 32 and bus 13. The key $K_D$ is manipulated on a pixel by pixel basis to allow the recirculation video data defining image 2 of the former positions of the baseball to be combined with the image 1 data on bus 12 defining the current position of the baseball so that the composite output video at terminal 17 does not exceed the maximum allowable gain at any pixel location. A background image 3 such as an image of homeplate may also be combined with the image 1 and 2 data via the background video bus 38 and the cutter 40. This background video is cut by a key $K_E$ which is manipulated as a function of the other keys $K_A$ and $K_B$ so that the composite video output at terminal 17 does not exceed the maximum allowable gain at any pixel location. From this structure, it can be seen that the trail images can be made to disappear and reappear simply by proper manipulation of the key $K_D$. The trail images can be made to disappear by reducing the key $K_D$ to 0. Since doing this does not destroy the video data in the framestore 28, the trail can be made to reappear by causing the key $K_D$ to assume any non zero value between 0 and 1.

Another special effect is possible by virtue of the structure of the embodiment shown in FIG. 1 which is not possible in the prior art. That effect is the "flying" of image 1 over image 2 without destroying image. This is done by manipulating the keys such that the key $K_B$ blocks any new video data on bus 20 from being written into the framestore 28 which would overwrite video image data stored therein. In such a case, the key processor 44 holds the key $K_B$ at 0 so that no updating of the framestore 28 occurs after the desired image 2 data is written into the framestore. The image 2 data is maintained in the framestore 28 by holding the key $K_C$ at a value of 1 so that no decay occurs therein. The key $K_D$ is then manipulated as a function of the key $K_A$ so that the image 1 and image 2 data are combined in the output summer 16 without causing the composite output video to exceed a gain of 1 at any pixel location.

The key processor 44 in FIG. 1 can be any circuitry or software/hardware combination that manipulates the key signals described above in the manner described above to perform the special effects described herein or any other special effects which the system is capable of performing.

Figure 2A:
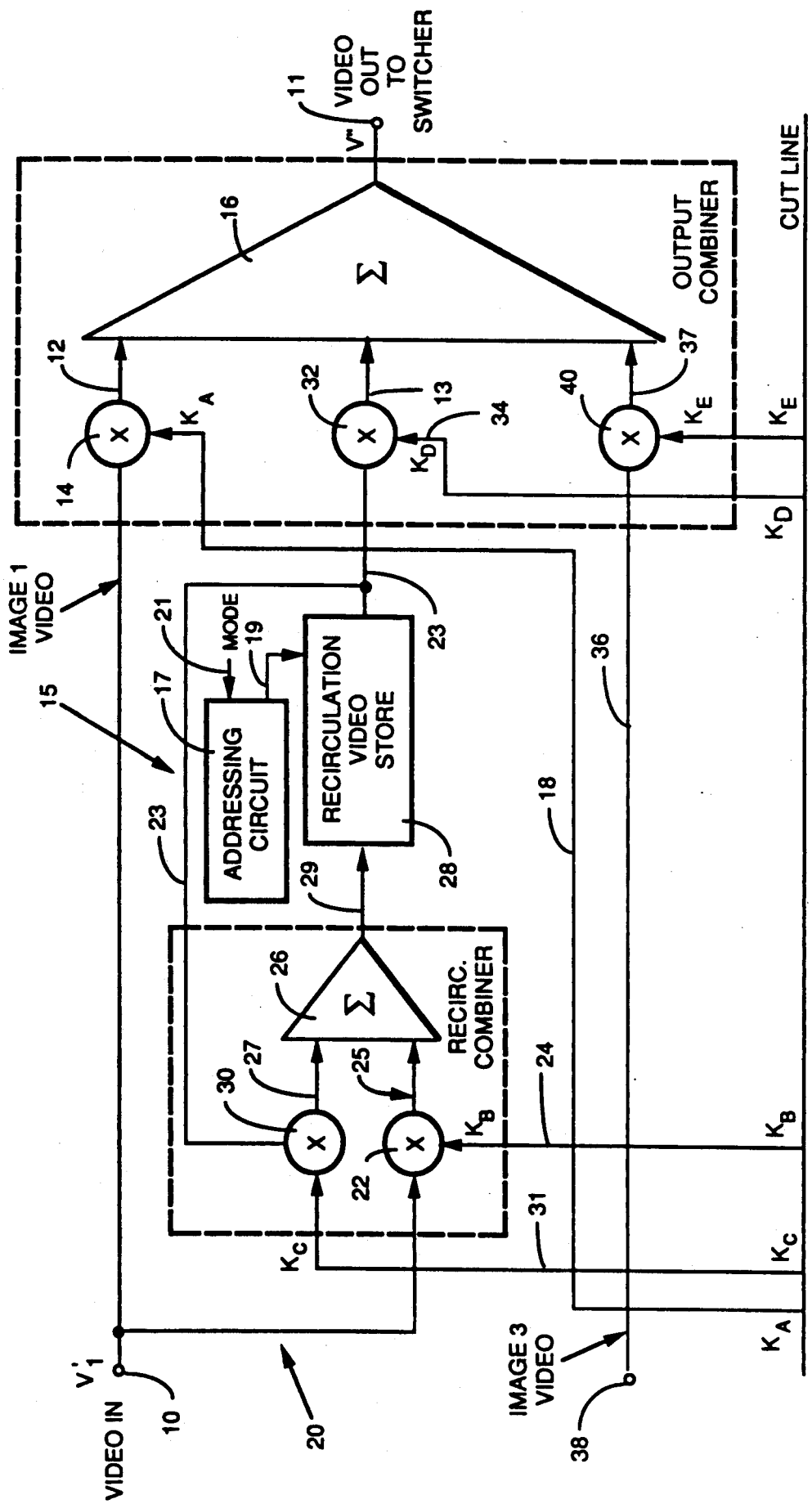
FIG. 2A and FIG. 2B are a representation in block diagram form of another embodiment of the video effects system according to the present invention.
Figure 2B:
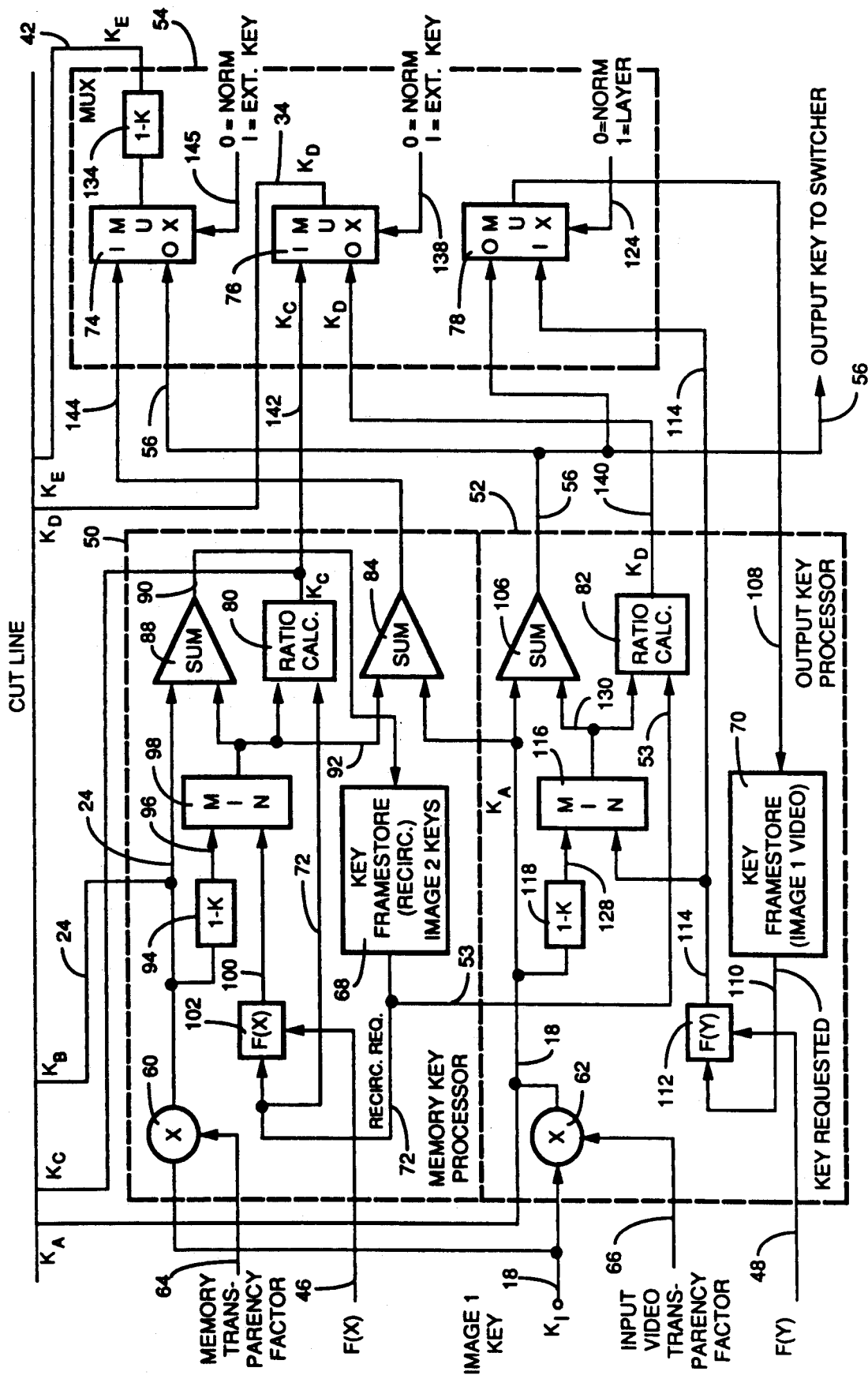

Referring next to FIGS. 2A and 2B, there is seen a second embodiment of a video -effects system according to the teachings of the present invention. This second embodiment is similar to the first embodiment shown in FIG. 1 except that the key processor 44, shown in phantom in FIG. 2, comprises a memory key processor 50, an output key processor 52, and a multiplexer 54. The memory key processor 50 and the output key processor 52 have structures which are similar to the channel A and B key processors described in U.S. patent application "A Recirculating Special Effects Video Framestore", Ser. No. 943,282, filed Dec. 8, 1986. More details on the structure and operation of the key processors will be given below.

An input key signal $K_I$ representing the requested key for the image 1 video arriving at the input 10 is presented at an input 18 and is coupled to the inputs of gain adjusting devices (multipliers or cutters) 60 and 62 in the memory key processor 50 and the output key processor 52 respectively. Each of the cutters 60 and 62 receives a transparency factor signal on lines 64 and 66, respectively. The cutter 60 receives a memory transparency factor signal on the line 64 which acts to cut the $K_I$ key to whatever level of transparency is desired for the image 2 data being written into the recirculation video store 28. The result of the operation of the cutter 60 is output as the $K_B$ key on line 24 to the cutter 22 to reduce the gain of the video on line 20 to some new level on line 25. The cutter 62 receives an input video transparency factor signal on the line 66 and cuts the key $K_I$ appropriately and outputs the result as the $K_A$ key on line 18 to the cutter 14. This cutter alters the gain of the incoming video of image 1 at the terminal 10 to the desired gain level of the image 1 video on line 12 coupled to a first input of the output summer 16. By an arbitrary assumption, the image 1 video has the highest priority and other keys in the system are processed to have the appropriate levels so that the image 1 video will have the highest priority and the other video sources will have their gain levels adjusted accordingly to make best use of the maximum allowable gain in the system.

Inputs 46 and 48 are provided for the memory key processor 50 and output key processor 52, respectively, to receive input signals $F(x)$ and $F(y)$, respectively, to control the key processors to produce decay of the video in the framestore 28 or decay of the image 2 video on line 13 respectively. This allows "trail", "reveal" or "layer" (flying image 1 over image 2 without destroying the portions of image 2 over which image 1 passes) special effects to be performed with the image 2 video decaying at any desired rate. This decaying can take place either in the recirculation loop 15 by virtue of decay of the video being written into the store 28 or by the action of the cutter 32 with a decaying key $K_D$. More specifically, the signal $F(x)$ controls the rate of decay of the key signals in the internal key recirculation loop of the memory key processor 50, and the signal $F(y)$ controls the rate of decay of the key signals in the internal key recirculation loop in the output key processor 52 as will be described in more detail below.

Each of the key processors 50 and 52 contain key framestores which store the keys for all the pixels for the last field or frame depending upon whether the system is operating in the field mode or the frame mode. More specifically, memory key processor 50 contains a key framestore 68 with one key storage location for every video pixel data storage location in the recirculation video framestore 28. The key for each video pixel in the framestore 28 is stored in a corresponding memory location in the key framestore 68 in the memory key processor 50. The key for each pixel in the last field or frame of image 1 video is stored in a corresponding key storage location in a key framestore 70 in the output key processor 52. Each of the recirculation video framestore 28, the key framestore 68 and the key framestore 70 have the proper number of storage locations to store video pixel data or the key for same in a one to one correspondence with the image 1 pixel data on each raster scan line for the current field of video pixel data being input at input 10. Each of the recirculation video store 28, the key framestore 68 and the key framestore 70 are sequentially addressed by addressing circuitry to address the storage locations corresponding to the current pixel and the current raster line of the image 1 video. The addressing circuitry for the key framestore 68 and the key framestore 70 is not shown in order to keep the drawings simple, but it is similar to the addressing circuitry 17 of the recirculating video framestore 28.

A signal RECIRC. REQ. representing the value of the "requested" key for the currently addressed pixel in the recirculation video store 28 is coupled from the memory key processor 50 via the line 53 to the output key processor 52. The RECIRC. REQ. signal is taken from the output bus 72 of the key framestore 68 since the output data there always represents the key of the corresponding pixel stored in the recirculation video store 28 which is currently being read on the bus 23. This data is used in a normalization process which will be described more fully below.

The multiplexer 54 receives the processed key signals from the memory key processor 50 and the output key processor 52. The multiplexer 54 includes 3 separate 2 input/1 output multiplexers 74, 76 and 78 which each receive switching control signals that define certain modes of operation for the embodiment shown in FIG. 2. Key signals for the cutters 32 and 40 as well as an output key signal at the output 56 for use by an external processing device, such as a video production switcher are taken from the outputs of the three multiplexers.

In operation, a key signal generated by a ratio calculation circuit 80 in the memory key processor 50 preferably is always connected to provide key signal $K_C$ to control processing of the recirculated video by the multiplier 30. In addition, the key $K_C$ is coupled to one input of the multiplexer 76 so that it can be used, for example, as key signal $K_D$ to control the multiplier 32 during "external key" modes of operation as will be explained more fully below. A key signal generated by a ratio calculation circuit 82 in the output key processor 52 is coupled to one input of the multiplexer 76, from which it may be transmitted over line 34 to control the multiplier 32 as the key $K_D$ during normal modes of operation. The multiplexer 74 and a summer 84 in the memory key processor provide the necessary processing to produce key signal $K_E$ to control the multiplier 40. This multiplier 40 permits background video to be input on bus 37 to the output summer 16 if desired when the sum of $K_D$ and $K_A$ is less than one.

The structure and operation of the output key processor are as follows. The function of the output key processor will be explained in the context of performance of the "reveal" special effect. In this effect, image 2 video is trapped in the framestore 28, and the image 1 data is blocked by the $K_B$ key from updating the framestore 28 so no image 1 data is written over any image 2 data in the framestore 28. The reveal effect is the appearance of image 2 data in the path of a moving image 1 object. For example, assume image 1 is a baseball moving across the screen from left to right, and image 2 is a stationary picture of a white home plate sitting in brown dirt. The reveal effect will be display of the image 2 video in the path of the moving baseball. Thus, if the pitch is a strike, the path of the baseball will show brown dirt until the baseball passes over the plate at which time the path of the baseball will be filled with the white pixels of the picture of homeplate. If the pitch only catches a corner of the plate, some of the pixels in the baseball path will be white and some will be brown.

To do such an effect, it is necessary for the output key processor to manipulate the key $K_D$ such that for all pixels in the path of the baseball but not including the pixels defining the current position of the baseball, the key $K_D$ is non-zero thereby revealing the contents of the framestore 28 at those pixel locations.

To start the reveal effect, the image 2 video must be written into the framestore 28 and frozen there. To do this, the picture of homeplate is supplied as video data to terminal 10 During this time, the MEMORY TRANSPARENCY FACTOR signal on line 64 is held at 1 and the key $K_I$ on line 18 is driven in accordance with the image 2 video data, i.e., the picture of homeplate. The input key $K_I$ then passes through the cutter 60 and becomes the key $K_B$ on line 24 during the process of trapping the image 2 video in the framestore 28. After the image 2 video is written into the store 28, the MEMORY TRANSPARENCY FACTOR signal on line 64 is set to zero until the reveal effect is completed. This prevents further updating of the framestore by cutting the $K_B$ key to 0. As the image 2 video is written into the video store 28, the key for each pixel of image 2 is simultaneously written into the key framestore 68. This occurs because the $K_B$ key on line 24 passes through a summer circuit 88 and is output on line 90 to the data input of the key framestore 68. The summer 88 adds the $K_B$ key on line 24 to a key signal on line 92 which is derived as follows. A key space available circuit 94 calculates the quantity $(1-K_B)$ and outputs same on line 96. This quantity which represents the remaining key resource not used by the $K_B$ key, is coupled to one input of a minimum calculating circuit 98. Another input of the minimum calculating circuit is coupled to a recirculating key signal on line 100. This key signal is the output of an $F(x)$ calculating circuit 102 which is a gain modifying device such as a multiplier. This circuit functions to receive the $F(x)$ decay control signal on line 46 and use it as a key to control how much gain reduction is applied to a key signal on a line 72 before outputting same as the key signal on the line 100. As noted earlier, the key signal on the line 72 is the recirculating key signal stream for the pixels currently stored in the recirculating video framestore 28. The minimum calculating circuit 98 calculates which of the key signals on the lines 96 and 100 is the smaller and outputs the smaller key signal on the line 92. The key on the line 92 is added to the key on line 24, and the sum is written as the recirculating key on line 90 into the key framestore 68. The key on the line 92 is also input to one input of the ratio calculating circuit 80. The other input of this circuit is coupled to receive the key signal on the line 72. The ratio calculating circuit 80 calculates the ratio of the key signal on line 92 as the numerator to the key on the line 72 as the denominator. This ratio is used as the key signal $K_C$ on line 31 to control the cutting action of the cutter 30 controlling the gain of the recirculated video on line 27.

A similar structure exists for the output key processor 52 as previously described for the memory key processor. The image 1 or input video key $K_I$ is cut by a transparency cutter 62 which receives a signal INPUT VIDEO TRANSPARENCY FACTOR on line 66 that controls the transparency factor of the image 1 video on bus 12. The output of the cutter 62 is the $K_A$ key signal on line 18. This key signal is also coupled to one input of a summer 106 which has its output line coupled as the external key output 56. This external key signal output is also coupled to one input of the multiplexer 74 and to one input of the multiplexer 78 The output of the multiplexer 78 on line 108 is coupled back into the data input of the key framestore 70 for the image 1 video. The data output of the key framestore 70 on line 110 is coupled to the input of a cutter 112 designated the $F(y)$ circuit. This circuit receives the $F(y)$ signal which controls the rate of decay of the recirculating keys for the image 1 video that are stored in the key framestore 70. If the signal $F(y)$ is less than 1, the stream of key signals on line 114 will have the gain of each key cut by the amount set by the signal $F(y)$. The resulting key signals are output on line 114 and are coupled to one input of a minimum calculating circuit 116. The line 114 is also coupled to one input of the multiplexer 78 so that the layer effect may be implemented as will be explained in more detail below. In this layer effect image 1 is "flown" over image 2 without destroying image 2. The only other circuits in the output key processor are the key space availability calculation circuit 118 and the ratio calculation circuit 82. The operation of these circuits will be explained next in the description of how the memory key processor 50 and the output key processor 52 function to allow various special effects to be performed.

To understand the functioning of the circuitry just described, recall that the purpose of the memory key processor 50 is to generate the key signal for the image 2 recirculation video as a function of the key signal $K_B$ for the incoming image/video to insure that the video to be stored in the video store 28 from the output of the summer 28 does not have a gain greater than the maximum available resource. The relationship between the maximum available resource and gain is such that a signal that is a composite of two or more video signals that can have gains between x volts and y volts also has a gain, i.e., a maximum signal excursion from x volts to y volts. Thus, if two signals each have maximum excursions from 0 to 1 volt and one has a gain of 0.5 volts at a particular pixel and the other has a gain of 0.3 volts at the corresponding pixel, the combined video signal will not have a gain of 0.8 at that pixel location. Instead, the gain of the combined pixel will depend upon the relative transparency factor of each pixel and which pixel has priority. This will become more clear in connection with the discussion of the functioning of the ratio calculation circuits 80 and 82. Also, recall that the overall purpose of the output key processor 52 is to generate the key signal $K_D$ for the image 2 video sent to the output summer 16 as a function of the key signal $K_A$ for the image 1 video sent to the output summer 16 so that the final composite video at the output 17 of the summer 16 does not have a gain greater than the maximum available resource.

Figure 3:
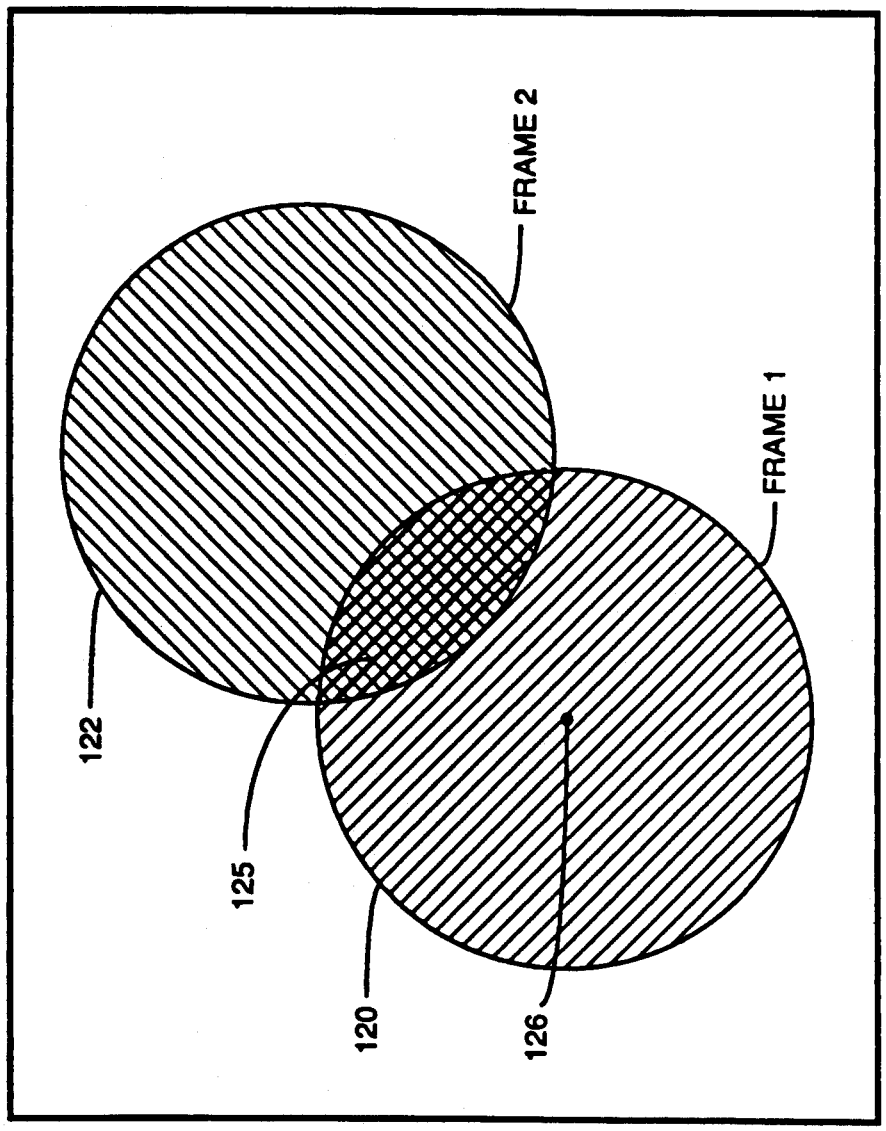
FIG. 3 is a drawing of a typical frame of special effect processed video to illustrate some of the teachings of the invention.

To best understand the operation of the output key processor 52 in the performance of the reveal effect, refer to FIG. 3 which shows the path of a moving baseball during two successive frames of image 1 video on line 12. The baseball at location 120 in frame 1 has a stream of key signals $K_A$ which are 1 (or less than 1 if the signal INPUT VIDEO TRANSPARENCY FACTOR is less than 1) for the pixels in the circular area of the frame within the perimeter of the baseball at location 120. All pixels outside this area have a key signal of 0. These key signals are written into the key framestore 70 during the first frame via the line 56, multiplex 78 and the line 108 since the multiplexer 78 is caused by a switching control signal on line 124 to select the normal mode of operation. This mode connects the 0 input, line 56, to the output 108.

In frame 2, the baseball has moved to the location shown at 122. In frame 2, the pixels inside the circular area bounded by the perimeter of the baseball at location 122 have key signals $K_A$ of 1 and all pixels outside this area have key signals $K_A$ of 0. Again these key signals $K_A$ from frame 2 are written into the key framestore 70 via lines 56 and 108 according to the mathematical operations performed by the output key processor as follows. The key signals $K_A$ from frame 2 inside the perimeter of the baseball at location 122 overwrite the key signals $K_A$ from frame 1 inside the perimeter of the baseball at the location 120 in the key store 70. The key signals in the key storage memory locations corresponding to the pixels in the overlapping cross hatched area 125 will be whatever the key signals $K_A$ were for the baseball at location 120. However, the 0 keys $K_A$ corresponding to the pixels located outside the baseball location at 122 (all zeros) in frame 2 do not overwrite the key signals $K_A$ in the key framestore 70 having a value of 1 corresponding to locations inside the baseball at the location 120 in frame 1 because of the operation of the circuitry of the output key processor. To understand this, assume that the key signal $K_A$ for a pixel shown at 126 has a value of 0 during frame 2 in FIG. 3 and is arriving during frame 2 on line 18 of the output key processor. The key space availability calculation circuit 118 outputs a 1 on line 128 coupled to the minimum circuit 116. This minimum circuit also receives a key signal on line 114 from the F(y) cutter 112 which represents the "key requested" and which is actually the key value for pixel 126 during frame 1. Assume that F(y) does not cut the key signal on line 110 and that the key signal for the pixel 126 during frame 1 was a 1. Since the minimum circuit 116 receives 2 key values of 1, it outputs a 1 on line 130. The key value on line 130 represents the "key resource received" of the key resource requested. This key value of 1 on line 130 is summed with the key value of 0 on line 18 representing the frame 2, image 1 value for pixel 126 by the summer circuit 106 and a key value of 1 is output on line 56 as the new key value for pixel 126 in frame 2. This represents the amount of key $K_D$ controlling the recirculation video gain of video data input to the output combine via line 13. However, the line 56 is not coupled to the $K_D$ cutter 32 for the reasons stated in the next paragraph. Instead, this key value is written into the storage location for pixel 126 in the key framestore 70 via the multiplexer 78 and the line 108 during the normal (reveal) mode of operation. Thus, the key framestore 70 collects the key values for all the pixel locations where the baseball has been as it moves across the screen as well as the keys for pixels outside the path of the baseball when it is at position 122 as well as the keys corresponding to locations inside the perimeter of the baseball at location 122.

The system works the same when the F(y) function cuts the key signal on the line 110 except that there is a decay in the value of the key signals stored in the key framestore 70 so that the trail of images where the baseball has been gradually fades away. In the case where F(y) cuts the "key requested" signal on line 110 to some smaller value on line 114, the minimum determining circuit 116 does not receive two 1's on lines 116 and 114. Assume that the key requested has been cut from 1 on line 110 to 0.8 on line 114. The minimum calculation circuit 116 then outputs a "key received" signal on line 130 of 0.8. This key signal is added to the 0 key on line 18 and output on line 107 for reinput to the key framestore 70. As long as F(y) remains at a value to cut the key signals on line 110, the keys being recirculated will be continually be made smaller. This causes a decay in the displayed trail because of the operation of the ratio calculation circuit 82 as will be explained next. The operation of the F(x) cutter 102 is the same and causes a decay of the video pixel data itself as it is stored in the recirculation video store 28.

The key signal on line 56 does not go to the cutter 32 as the $K_D$ key signal, because the recirculation video stored in the framestore 28 has already been previously cut by other key signals such as $K_C$ and $K_B$. Thus, the key signal on line 56 cannot be used directly as the key signal $K_D$ since the image 2 video coming out of the framestore 28 may have already been cut to the desired value indicated by the key signal on line 56 or some value less than 1 but greater than the cut required by the key signal on line 56. To prevent the further cutting that would occur if the key signal on line 56 were used as the key signal $K_D$, the ratio calculation circuit 82 is used. This circuit receives the key signal on line 53 which indicates the amount the current pixel stored in the framestore 28 has already been cut. The other input on line 130 is the desired gain level in the form of the "key received" key output from the minimum calculating circuit 116. The ratio of these two signals, i.e., "key received" on line 130/divided by the "key of recirculation framestore pixel" on line 53, is used as the $K_D$ key signal to cut the recirculation video on the line 23 to the correct gain level on line 13.

For example, if the pixel on line 23 coming out of the recirculation video store 28 had already had its gain cut to 0.5, and the desired gain for the recirculation video on line 13 was 0.5 based upon the gain of the higher priority pixel on line 12 as known from the value of the $K_A$ key signal on line 18 and the operation of the minimum detecting circuit 116, then the key signal on line 130 would be 0.5 (this key always represents the calculated gain for the video on line 13 to insure that the sum of the gains of the video on lines 12 and 13 is always 1 or less). Therefore, no further cutting would be required by the cutter 32 since the gain of the recirculation video emerging on line 23 is already at the desired gain level for the video on line 13. Thus, the output of the ratio calculation circuit 82 would be 0.5/0.5 or 1 for the $K_D$ signal thereby allowing the video on line 23 to pass uncut through the cutter 32 so that the video on line 13 would have the desired gain of 0.5. Likewise, if the recirculation video pixel on line 23 already had a gain of 0.5, but the "key received" signal on line 130 indicated that the gain needed on line 13 was only 0.25, then the key $K_D$ would have to be 0.5 to cut the 0.5 gain video on line 23 to a gain of 0.25. In this situation, the key signal on line 53 would be 0.5 corresponding to the gain of the pixel on line 23, and the signal on line 130 would be 0.25. The ratio of the two would be 0.5 for the signal $K_D$.

The memory key processor does the same type of operation as described above when new video is being written into the framestore 28. In this circuit, the key signal on line 96 will be the key space available for the recirculation video on line 27 based upon the gain taken by the higher priority new video pixels arriving on line 25. That is, the key signal on line 96 represents the most gain available to the signal on line 27, and therefore the maximum key signal $K_C$ available based upon the value of the $K_B$ signal. The key signal on line 100 represents the recirculation video gain requested, i.e., the present gain of the image 2 pixel then present on line 23 at the input of the cutter 30. The minimum calculation circuit 98 determines the minimum of the these two key signals on lines 96 and 100 and outputs same on line 92. The key signal on line 92 represents the percentage of the total available resource at the output combiner which is available to the image 2 pixel in the framestore.

The key signals on lines 92 and 24 are then added by summer 88 to determine the key signal to be stored in the key framestore 68 for the current frame. The ratio calculating circuit 80 is present to insure that in the case the key of the image 2 pixel coming out of the recirculation video store 28 at line 23 is already at the desired gain level specified by the key signal on line 92 or at some gain level between the desired gain and 1, that only the appropriate level of cutting is performed at cutter 30 via the $K_C$ key on line 31 to obtain the desired gain level for the recirculation video at line 27. Accordingly, the ratio calculating circuit calculates the ratio of the key on line 92 to the key on line 72. The key on line 72 represents the already existing gain, i.e., the key of the recirculation video on line 23. Thus, the ratio calculating circuit 80 determines the correct value for $K_C$ to prevent the recirculation video on line 23 from being cut further if it already has the desired gain and, if the recirculation video needs to have its gain cut, to insure that the gain thereof is cut only the minimum amount necessary to achieve the desired gain.

Thus, if the gain of the video on line 23 is 0.7 and the key $K_B$ is 0.4, the key space available on line 96 is 0.6 and the key signal on line 100 is 0.7. The minimum calculation circuit determines that the maximum gain available for the video on line 27 is 0.6 which is less than the current gain of the video on line 23 at 0.7 so a cut at cutter 30 must be made. The ratio calculating circuit then outputs a key signal $K_C$ of 0.6/0.7 which when multiplied by the gain of the video on line 23 (0.7) results in the desired gain of 0.6 for the video on line 27 this gives a gain for the video on line 29 of 1 or the maximum available resource. The resulting key written into the key framestore 68 for this pixel is 1 on line 90 by the action of the summer 88 adding the 0.6 key on line 132 to the 0.4 $K_B$ key on line 24 thereby accurately representing the key for the corresponding video pixel stored in the recirculation video store 28.

The multiplexers in the switching matrix 54 serve to control the mode of operation of the system. The composite video at the output 17 is often coupled to a video switcher. It is an assumption in the design of most present video switchers that the video coming into the switcher is always at gain equal to 1 and the switcher will then multiply the video down to the appropriate gain using a key supplied to the switcher for the incoming video. This external key function is the reason for the key output 56. In order to insure that the video on line 17 always has a gain of 1, the background video path 37 and the key $K_E$ is provided. To fulfill the assumption made by most switchers that the gain of the incoming video is always 1, the key processors 50 and 52 and the switching matrix 54 combine to generate the key $K_E$ such that the sum $K_E + K_D + K_A = 1$ at all times. The way this is done is to drive the multiplexer select line 145 to cause the multiplexer 74 to select the key signal on line 56 for coupling to a key space available calculation circuit 134 during normal mode operations. As noted above, the key signal on line 56 is always equal to the gain of the video on the recirculation video input path 13 plus the gain of the video on the image 1 video path 12 to the output summer 16. Thus, the key signal $K_E$ on line 42 is always equal to $1-(K_A+K_D)$. Note that the external key on line 56 to the switcher is only the sum of the key signals $K_A$ and the "key received" signal generated by the output key processor 52 to control the recirculated video gain for image 2 on line 13, i.e., the key signal on line 130. The reason for this is that the switcher design is based upon an assumption that only the gain of the image 1 and image 2 recirculation video is in the external key signal and no background gain is included.

To understand the functioning of the multiplexer 76, assume that there is a decaying key $K_D$ coming out of the ratio calculating circuit 82. In the normal mode of operation, the multiplexer receives a switching control signal on line 138 which causes the line 140 to be selected and coupled to the line 34 as the key signal $K_D$. This causes the images in the image 2 video, i.e., the trail images to slowly fade away.

In certain circumstances such as when a video switcher of the type described above is used (a switcher which assumes that the incoming video has a gain of 1 but which must be cut to a lesser gain in accordance with the key on line 56), it is desirable to have the video on line 11 to the switcher not decreasing in gain while the key on output line 56 is decreasing. In such a circumstance, the switcher cuts the gain of the video on line 17 using the key on line 56, and this is called the external key mode. This mode requires that the $K_D$ key be held constant while the operation of the output key processor goes on normally to decay or otherwise alter the value of the key signal on line 56. In this mode, the switching control signal in the line 138 causes the multiplexer 76 to choose the line 142 carrying the $K_C$ key signal for coupling to line 34 as the $K_D$ key. This coupling causes the non decaying key signal on line 142 to be applied to the cutter 32 as the key $K_D$. Thus, the video on line 13 is not decaying but the external key on line 56 is decaying so that the switcher coupled to line 11 may properly decay the combined video on line 11 according to the key on line 56.

Because the key $K_D$ is altered in this mode, the key $K_E$ must also be altered so that the background video does not get out of proportion. This is the purpose of the multiplexer 74. In the external key mode, the multiplexer 74 selects the key signal on the line 144 for coupling to line 42 as the $K_E$ signal. The key signal on the line 144 is the sum of the "key received" on line 92 calculated by the memory key processor and the key $K_A$.

The "layer" effect where image 1 flies over a frozen image 2 stored in the framestore without destroying image 2 involves the operation of the multiplexer 78. When operating in layer- mode, the multiplexer 78 selects line 114 for coupling to the line 108. Also, the memory key processor is operated to freeze the video trapped in the framestore 28 without updating it with new video from line 20. This is done by setting the MEMORY TRANSPARENCY FACTOR signal on line 64 to 0 to cause the cutter 22 to block any video from line 20 from entering the summer 28. Causing the multiplexer 78 to select the key signal on the line 114 causes the key requested signal on line 110 at the output of the key framestore 70 to be recycled back into the input of the key framestore 70 after passing through the F(y) cutter 112. The F(y) cutter 112 passes the key signals on line 110 through to the line 114 uncut. This looping connection holds the keys in the key framestore 70 steady so that there is no updating. This prevents the swath of non zero key signals representing pixels where a moving object in image 1 on line 12 has been from being stored and maintained in the key framestore 70 as was done on the "reveal" effect. Thus, the $K_D$ key is calculated based only upon the key signals $K_A$ for the current position of the moving object in image 1. This means that the recirculation video of image 2 will be visible at all places on the screen except where the moving object of image 1 is currently located. The image 2 video will even show through the image 1 video if the INPUT VIDEO TRANSPARENCY FACTOR signal on line 66 is set to make the image 1 video transparent.

By providing separate control of the processing of keys by the memory key processor 50 and the output key processor 52, it is possible to achieve a wide variety of video effects. For example, by inputting video into the framestore 28 and recirculating it through the multiplier 30 and summer 26, wherein it is combined with new input video, effects similar to previous special effects systems can be achieved, wherein the video in the video store 28 is cut in accordance with the value of the key signal $K_C$. The output of the video store 28 is transmitted to the output summer 16 through the multiplier 32 which, in external key mode, is controlled with a key signal $K_D$ which has the same value as the key signal $K_C$. This occurs because the matrix 54 passes the key signal from the memory key processor 50 to the line 34 by action of the multiplexer 76. Thus the system is capable of performing substantially all effects provided by previous systems.

In addition, other effects are possible. For example, video can be stored in store 28 by setting $K_B$ and $K_C$ to one until the desired video is stored and then setting $K_B$ to zero so that no further updating of the image 2 video in the store 28 occurs while maintaining $K_C$ at one so that the video in the store 28 does not decay as it recirculates. In this manner, the same video information will be circulated uncut. However, if $K_D$ is set at zero, this video information will not be passed to the summer 16. Instead, $K_E$ can be set at one, whereupon background video input at 38 will be transmitted in the absence of video input $V_I'$, because, in the preferred embodiment, the key processors give first priority in setting key signal values to input video $V_I'$, then to recirculated video of image 2 and then to background video. Thus $K_D$ can be no greater than $1-K_A$ and $K_E$ can be no greater than $1-(K_D+K_A)$.

There are other algorithms that may be implemented by the key processors. The current algorithm implemented by the key processors is to calculate the key received, i.e., the key signals on lines 130 and 92, as the minimum of either the key requested (the key signals on lines 110 and 72, respectively) or the key available (the key signals on line 128 and 96, respectively). As an alternative to this algorithm, the key received for each image 2 video pixel could be calculated by multiplying the key requested for each image 2 video pixel times the key available, i.e., the quantity $1-K_A$, where $K_A$ is the image 1 video pixel key for the same pixel.

The embodiments described above may be implemented in software on a general purpose computer. Both real time and non real time embodiments in pure software may be implemented. In addition, in some alternative embodiments, the cutter 22 may be deleted and a simple switch substituted. When the switch is open, no updating of the video in the framestore 28 occurs which is the state the system must be in to perform reveal and layer effects. When the switch is closed, the framestore is updated with video from line 20 and effects such as trails may be performed.

By variety in the control of the key processor 54 in producing the various key signals used in the video effects system of this invention, a wide variety of video effects may be provided.

It will be understood by those skilled in the art that the timing of addressing and performing the read and write cycles for the various framestores and key framestores in the embodiments described herein must be matched to the pixel data rate of the raster scan. One way this can be done is by using shift registers and reading and writing a plurality of pixels at a time in parallel load and unload operations while shifting pixel data into or out of the shift registers at the video pixel scanning rate. Further, account must be taken in the key processors for the delays involved in processing in the key recirculation loops described herein. One way of doing this is reading and writing addresses in the key framestores non sequentially. In other words, because of timing considerations related to circuit delays, it is desirable to read blocks of data at particular times and write blocks of data to these same addresses at later times to accommodate circuit delays. Those skilled in the art will appreciate how these timing considerations can be accommodated.

It will be appreciated that the embodiments herein are but one example for practicing the invention, and there are various alternatives, modifications, variations and improvements thereon which may be made by those skilled in the art from this teaching, which are intended to be encompassed by the following claims.

What is claimed is:

1. A video effects system for generating composite output video from one or more video sources comprising:
   a video input;
   recirculation means having an output and having an input coupled to said video input for storing video from said video input and presenting said stored video at said output at a later time;
   output combine means coupled to said video input and to the output of said recirculation means for combining video from said video input and from the output of said recirculation means in proportion to first and second key signals to generate composite output video;
   a first key processor means for generating said first and second key signals such that one of said first and second key signals is a function of the other of said first and second key signals such that said output video does not have a gain in excess of the maximum available gain resource;
   wherein said recirculation means includes means to couple a recirculated video from said output back into the input of said recirculation means to alter a gain of said recirculated video in accordance with a third key signal and to combine said recirculated video with video from said video input; and
   further comprising second key processor means for generating said third key signal as a function of a fourth key signal such that the combined video stored in said recirculation means does not have a gain greater than a maximum available gain resource.

2. The apparatus of claim 1 further comprising gain modifying means coupled between said video input and said input to said recirculating means and having an input for receiving said fourth key signal, for modifying the gain of video from said video input in accordance with said fourth key signal, and wherein said second key processor means has an input for a memory transparency key signal and includes means for generating said fourth key signal in accordance with said memory transparency key signal.

3. The apparatus of claim 2 further comprising an input of said first key processor means for receiving an input video transparency control signal and an input for receiving an image key signal and further comprising means in said first key processor means for generating said first key signal from said image key signal in accordance with said input video transparency control signal and wherein said second key processor means includes an input for receiving said image key signal and includes means for calculating said fourth key signal from said image key signal and said memory transparency control signal.

4. The apparatus of claim 2 wherein said second key processor means includes first key framestore means for storing and recirculating after a delay the values of key signals related to said third key signal and includes means for calculating the value of said third key signal from the value of a said recirculated key signal and from the value of said fourth key signal.

5. The apparatus of claim 4 wherein said first key processor means includes second key framestore means for storing and recirculating after a delay the values of key signals related to said second key signal and includes means for calculating the value of said second key signal from the value of a said recirculated key signal and from the value of said first key signal.

6. The apparatus of claim 5 wherein said video and key signals are digital data and wherein said recirculation means and said first and second key framestore means are digital memories having a capacity to store up to one frame's worth of digital data, each said digital memory having an address bus and further comprising an addressing means having a mode control input for receiving a mode control signal to control whether said addressing means operates in a field mode or a frame mode and coupled to said address bus for generating addressing signals according to said mode signal so as to cause recirculation of said stored video data and stored key signals after one field delay when operating in field mode and so as to cause recirculation of said store video data and stored key signals after one frame delay when operating in frame mode.

7. A video special effects apparatus comprising:
   a video input;
   an output combine means having a first video input coupled to said video input and having at least a second video input, for adjusting the gain of video signals presented at said first and second video inputs in accordance with first and second key signals, respectively, to create adjusted gain video signals and for combining the resulting adjusted gain video signals into a composite video output signal at an output;
   an input combine means having a third video input coupled to said video input and having a fourth video input, for adjusting the gain of video presented at said third and fourth video inputs in accordance with third and fourth key signals, respectively and for combining the resulting gain adjusted video into a composite video signal at a recirculation port;
   recirculation means having an input coupled to said recirculation port and having a recirculation video output coupled to said fourth video input and to said second video input of said output combine, for receiving video from said recirculation port and delaying it for a selectable interval and then presenting said delayed video at said recirculation video output; and first key processor means coupled to said output combine means and second key processor means coupled to said input combine means for generating said first, second, third and fourth key signals in accordance with particular special effects to be performed.

8. The apparatus of claim 7 wherein said first and second key processor means for generating said first, second, third and fourth key signals in such a manner that said composite video signal at said output of said output combine means may be generated which, if displayed, depicts a moving object with a trail of images which may be made to disappear and reappear.

9. The apparatus of claim 7 wherein said first and second key processor means are for generating said first, second, third and fourth key signals in such a manner that said composite video signal at said output of said output combine means may be generated which, if displayed, depicts an image of a first moving object moving over a second image which is stationary without destroying any portion of said second image which the image of said first moving object passes over.

10. The apparatus of claim 7 wherein said first and second key processor means are for generating said first, second, third and fourth key signals in such a manner that said composite video signal at said output of said output combine means may be generated which, if displayed, depicts an image of a first moving object moving over a field and leaving a swath of video pixels in its path which display yet another image.

11. Apparatus for combining a plurality of video signals for display, comprising:

an input means for receiving video information;

loop means, including a first summer means connected to the input of a storage means, for recirculating said video information;

second summer means connected both to said input means and to said loop means;

first processor means for producing a first key signal and a second key signal;

second processor means connected between the output of said storage means and said second summer means, for providing to said second summer means said video information recirculating in said loop means adjusted by said first key signal; and third processor means connected to the output of said storage means in said loop means for adjusting by said second key signal the level of said video information recirculating in said loop means.

12. A video effects system comprising:

an output combiner having first, second and third video data inputs for summing the video data received at said first, second and third video data inputs and data outputting the combined video data at a video data output;

first gain modifying means having a first key signal data input for receiving input video data and for altering the gain thereof in accordance with a first key signal and for coupling the gain modified video to said first data input;

framestore means for storing recirculation video data and having a video data input, a video data output and an address data input;

second gain modifying means having a second key signal data input and having a recirculation video data input for receiving said recirculation video data from the video data output of said framestore means and for modifying the gain of said recirculation video data in accordance with said second key signal and for coupling the gain modified video to said second data input;

a recirculation video combiner means having a video data output coupled to the video data input of said framestore means and having an update video data input and a recirculation video data input for combining the video data received at said update video data input and said recirculation video data input and for outputting the combined data to the video data input of said framestore means;

third gain modifying means having a video data input coupled to the video data output of said framestore means, a video data output coupled to the recirculation video data input of said recirculation video combiner means and a key signal data input for receiving a third key signal for modifying recirculation video data received from said video data output of said framestore means in accordance with said third key signal and coupling the resulting video data to said recirculation video data input of said recirculation video combiner means;

fourth gain modifying means having a key signal input for receiving a fourth key signal and for coupling said input video data to said update video data input of said recirculation video combiner means and modifying the gain of the video data so coupled in accordance with said fourth key signal;

fifth gain modifying means having a key signal input for receiving a fifth key signal and for coupling a second source of input video data to said third input and for modifying the gain of said video data from said second source of input video data in accordance with said fifth key signal;

key processor means coupled to said first, second, third fourth and fifth gain modifying means and having an input for receiving an input video key signal, for generating said first key signal based upon the value of said input video key signal, and for generating said second key signal as a function of the value of said first key signal such that the gain of the video data at the output of said output combiner is never greater than a predetermined maximum gain, and for generating said third key signal as a function of said fourth key signal such that the gain of the video data at the data output of said recirculation video combiner means is never greater than a predetermined maximum gain.

13. An apparatus as defined in claim 12 further comprising a first key modifying means having a first key signal data input coupled to receive said input video key signal and having a key signal data output coupled to said first key signal data input and having a transparency control signal input for receiving a transparency control signal, for modifying the value of said input video key signal in accordance with the value of said transparency control signal and for outputting the modified key signal as said first key signal, and wherein said framestore means is a digital memory having a sufficient number of memory location to store all the pixels in one frame of video pixel data and further comprising addressing means for addressing said memory locations in either of two selectable modes: a frame mode wherein new video data is written into the memory locations until a complete frame of video pixel data has been written before the addressing means resets to begin writing at the first video pixel storage location for the field again, and wherein said addressing means generates the appropriate address and control signals to cause the reading of pixel data out of said framestore means starting from a first video pixel storage location in the field of stored video pixel locations and continues causing said reading until an entire frame of video data is read before the addressing means resets to the beginning video pixel storage location in the field and generate the appropriate address and control signals to cause reading of the video pixel data at the first video pixel location in the field of said video pixel storage locations; and an interlaced field mode in which said addressing means provide addresses and control signals to said framestore means to cause sequential writing of video pixel data from an entire first interlaced field of video pixel data presented at said video data input before resetting and generating the appropriate address and control signals to cause writing of new video pixel data from a second interlaced field presented at said video pixel input, said writing proceeding from first video pixel location in the second interlaced field to the last pixel storage location in said second interlaced field, where the video pixel data in the second interlaced field is stored in substantially the same memory locations as said video pixel data from said first interlaced field, and where said addressing means is for generating the appropriate address and control signals to address and read all the video pixel storage locations in said first interlaced field of video pixel data and causes outputting of said video pixel data sequentially at said video data output of said framestore means for recirculation and then resets and begins to address and read video pixel data again starting at the first video pixel storage location of the field of said video pixel storage locations.

14. An apparatus as defined in claim 12 wherein said key processor means is comprised of an output key processor means and a memory key processor means wherein said output key processor means comprises means for generating said first key signal based upon the value of said input video key signal, and for generating said second key signal as a function of the value of said first key signal such that the gain of the video data at the output of said output combiner is never greater than a predetermined maximum gain and wherein said memory key processor comprises means for generating said fourth key signal based upon the value of said input video key signal and for generating said third key signal as a function of said fourth key signal such that the gain of the video data at the data output of said recirculation video combiner means is never greater than a predetermined maximum gain.

15. The apparatus of claim 14 further comprising a first key modifying means having a first key signal data input coupled to receive said input video key signal and having a key signal data output coupled to said first key signal data input and having a transparency control signal input for receiving a first transparency control signal, for modifying the value of said input video key signal in accordance with the value of said first transparency control signal and for outputting the modified key signal as said first key signal, and further comprising a second key modifying means having a first key signal data input coupled to receive said input video key signal and having a key signal data output coupled to said fourth key signal data input and having a transparency control signal input for receiving a second transparency control signal, for modifying the value of said input video key signal in accordance with the value of said second transparency control signal and for outputting the modified key signal as said fourth key signal.

16. A video effects system comprising an output combine means coupled to a source of input video data and having at least one other video input for summing video data from said at least one other input with video data from said source of input video data to form a combined video data signal and for outputting video data equaling the sum of said combined video data, and further comprising a single video recirculation loop means for storing and recirculating video data and presenting the recirculated video data at a recirculation loop output, said recirculation loop means having an input coupled to said source of input video data and having said recirculation loop output coupled to said output combine means via a data path through a gain modifying means, said gain modifying means having a key signal input for receiving a key signal, said gain modifying means for modifying the gain of the video data emerging from said recirculation loop output by a factor set by said key signal before coupling said recirculating data into said output combine means for summing with said input video data, said recirculation loop means including a recirculation combine means for combining a predetermined fraction of the gain of said recirculated video data with a selectable amount of the gain of said video input data, said recirculation loop means also including means for providing a selectable delay of either one field or one frame of video data forming a raster scanned video picture from the time of input of new video data into said recirculation loop means to the time the new data arrives at said gain modifying means, and further comprising key processing means to generate said key signal so that it has a value calculated to insure that the combined gain of the video data emerging from said data output of said output combine means does not exceed a maximum available gain resource.

17. The apparatus of claim 16 wherein said key processing means is coupled to said recirculation combine means to control the predetermined fraction of the gain of said recirculated video data that is combined with the selected amount of the gain of said video input data with which the recirculated video data is to be combined so that the gain of the combined video data to be recirculated after the combination does not exceed the maximum available gain resource.

18. A video effects system comprising an output combine and a single video data recirculation loop having an output and a first gain modifying means for controlling the gain of recirculation video data emerging from the output of said recirculation means, wherein said output combine is coupled to sum video data from a first and second video data source with recirculation video data from the output of said recirculation loop after said recirculation video data has had its gain modified by said first gain modifying means in such a way that the gain of the composite video so formed is less than or equal to a maximum gain resource, and wherein said recirculation loop includes a recirculation combine for combining said recirculation video data with video data from said first video data source for storage and recirculation, and further includes second gain modification means for controlling the gain of said recirculation video data prior to combination with video data from said first video data source such that the video data combined by said recirculation combine does not have a gain greater than the maximum available gain resource.

19. The apparatus of claim 18 further comprising a delay memory means in said recirculation loop for storing said recirculation video data in combination with incoming video data from said first video data source, said delay memory means being coupled to addressing means for generating the proper address and control signals to cause said delay memory means to output for recirculation the stored data after a selectable delay of either one field or one frame.

20. The apparatus of claim 18 further comprising addressing means associated with said delay memory means for causing said delay memory means to store incoming video data from said recirculation combine and to read and output data stored therein for recirculation in either a field mode or a frame mode where, in the field mode, said delay memory means stores each new field of incoming video data in substantially the same locations and outputs first field data from the current frame as recirculation data during receipt of the second field of the current frame and stores the second field video data during receipt of said second field in the current frame and outputs said second field video data as the recirculation data during the interval during which the first field of the next fame is being received thereby delaying the output at the output of said recirculation loop of each field of data as recirculation data by one field time from the time of beginning the storage of each said field of data.

21. The apparatus of claim 18 wherein said first gain modifying means has an input for receiving a first key control signal from an external source for controlling the amount of adjustment of the gain of recirculation video data from said output of said recirculation loop.

22. The apparatus of claim 21 wherein said second gain modification means has an input for receiving a second key control signal from an external source for controlling the amount of adjustment of the gain of recirculation video data from said output of said recirculation loop.

23. The apparatus of claim 22 further comprising a third gain modification means coupling video data from said first video source to said recirculation combine for cutting the gain of video data from said first video source by an amount set by first key data received at a first key data input, and further comprising a key data input for receiving input key data describing the gain of said video data arriving from said first video source and key data manipulation means having an input for a first transparency signal, said key data manipulation means for coupling said input key data from said key data input to said first key data input as said first key data and for altering the input key data to a value for said first key data in accordance with the value of said first transparency signal.

24. A method of operating a video effects system to cause a trail of images of a moving object to appear, disappear and reappear at will in any order in an output video signal, said video effects system having an output combine for combining video from two sources of video data coupled to first and second video inputs and having a single video data recirculation loop including a memory for storing and recirculating video data and having an output and at least one gain modifying device for coupling recirculation video data appearing at said output to said second video input of said output combine while simultaneously modifying the gain thereof in accordance with a key signal, comprising the steps of:

supplying video data to said first input of said output combine;

supplying video data to said video data recirculation loop for storage and recirculation;

recirculating video data in said recirculation loop and coupling the recirculated video data to said output;

setting said key signal at any desired level so that said gain modifying device alters the gain of recirculation video data reaching said second video input to vary in accordance with the desired appearance or disappearance of a trail represented by said recirculation video data while not affecting the recirculation video data recirculating in said video data recirculation loop such that said trail can be made to reappear at any time.

25. A method of operating a video effects system to do a reveal effect wherein a moving object in image 1, comprised of a sequence of frames of video pixel data depicting and moving object where each pixel in each frame of the video data comprising image 1 has a corresponding first key signal, reveals in its path the pixels of a frame of recirculation video data comprising a fixed image 2 stored in a recirculation loop, and where said recirculation loop outputs said recirculation video data of image 2 at an output coupled to an output combine through a gain adjusting device, said output combine having a second input for receiving the video data of image 1, said gain adjusting device having an input for receiving a second key signal controlling the gain of said recirculation video data applied to said output combine and further comprising at least one key framestore, comprising the steps of:

storing the video data of the pixels of image 2 in said recirculation loops;

receiving the video data of each frame of image 1 and applying said image 1 video data to said output combine;

outputting said recirculation video data of image 2 stored in said recirculation loop at said output simultaneously with the receipt of corresponding video data of image 1;

receiving the corresponding first key signal for each pixel of said video data of image 1 simultaneously with the receipt of each pixel of video data of image 1;

generating said second key signal for each pixel of said recirculation video data based upon a predetermined relationship to said first key signal such that when the video data output combine is displayed, video data of image 2 appears in the positions once occupied by said moving object in said image 1 but not outside the path of said moving object; and adjusting the gain of each pixel of said recirculation video data which is output to said output combine by the corresponding value of said second key signal to generate a plurality of gain adjusted recirculation video data pixels without adjusting the gain of the pixels of recirculation video data recirculating in said recirculation loop; and combining said gain adjusted recirculation video data pixels with the corresponding pixels of video data of the current frame of said image 1 video data to generate output video data embodying said video effect.

26. A method of operating a video effects system to do a video effect wherein an image 1 and an image 2 are superimposed where each of image 1 and image 2 are comprised of one or more frames of raster scanned video pixel data where each pixel in each frame of the video data comprising image 1 and image 2 have corresponding first and second key signals, respectively, and wherein the pixels of said image 1 obscure the pixels of said image 2 by virtue of having higher priority, said pixels of video data for image 2 being stored in a recirculation loop, and wherein the obscuring of pixels of image 2 by pixels of image 1 does not alter the video data of the pixels of image 2 such that the pixels of image 2 can once again be seen after said pixels of video data of image 1 are no longer obscuring the pixels of image 2 and wherein said recirculation loop outputs recirculation video data defining image 2 at an output coupled to an output combine through a gain adjusting device, said output combine having a second input for receiving the video data of image 1, said gain adjusting device having an input for receiving said second key signal controlling the gain of said recirculation video data applied to said output combine, comprising the steps of:

- storing the video data of the pixels of image 2 in said recirculation loop;
- receiving the video pixel data of each frame of image 1 and applying said image 1 video pixel data to said output combine;
- outputting each pixel of the recirculation video pixel data of image 2 stored in said recirculation loop at said output synchronously with the receipt of the video data of the corresponding pixel of the current frame of image 1;
- receiving the corresponding first key signal for each pixel of said video data of image 1 synchronously with the receipt of each pixel of video data of image 1;
- generating said second key signal for each pixel of said recirculation video data based upon a predetermined relationship between said second key signal and said first key signal such that said image 1 pixels at least partially obscure the pixels of image 2 wherever the image 1 pixels are nonzero, but such that the underlying pixel of image 2 reappears wherever and whenever a corresponding pixel of image 1 does not consume all of a maximum available gain resource; and
- adjusting the gain of each pixel of said recirculation video data output to said output combine by the corresponding value of said second key signal to generate a plurality of gain adjusted recirculation video pixels without adjusting the gain of the pixels of recirculation video data defining image 2 recirculating in said recirculation loop; and
- combining said gain adjusted recirculation video pixels defining image 2 with the pixels of the current frame of said image 1 video data.

* * * * *